J. P. Gallagher,
Globe Valve,
Nº 48,673. Patented July 11, 1865.

Witnesses:

Inventor:
J. P. Gallagher

UNITED STATES PATENT OFFICE.

JOSEPH P. GALLAGHER, OF ST. LOUIS, MISSOURI.

IMPROVEMENT IN COCKS.

Specification forming part of Letters Patent No. 48,673, dated July 11, 1865.

*To all whom it may concern:*

Be it known that I, J. P. GALLAGHER, of St. Louis, in the county of St. Louis and State of Missouri, have invented a new and useful Improvement in Cocks or Faucets; and I do hereby declare that the following is a full, clear, and exact description thereof, which will enable those skilled in the art to make and use the same, reference being had to the accompanying drawings, forming part of this specification.

Figure 1:
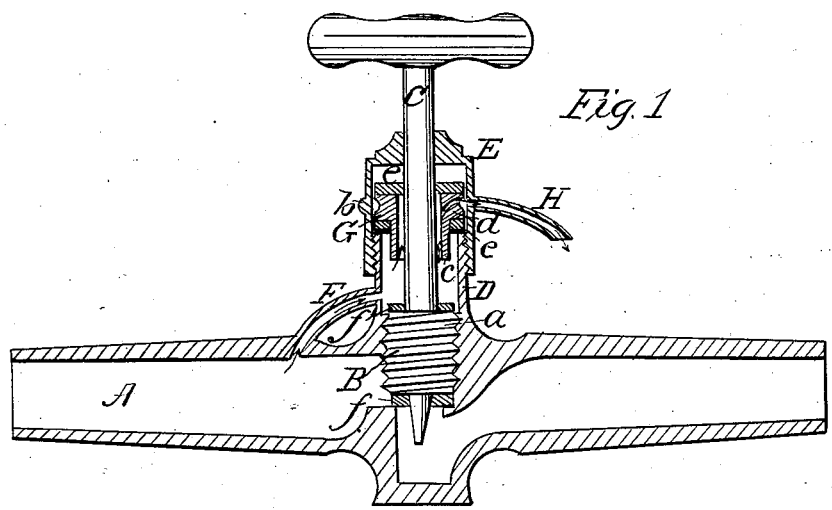
Figure 2:
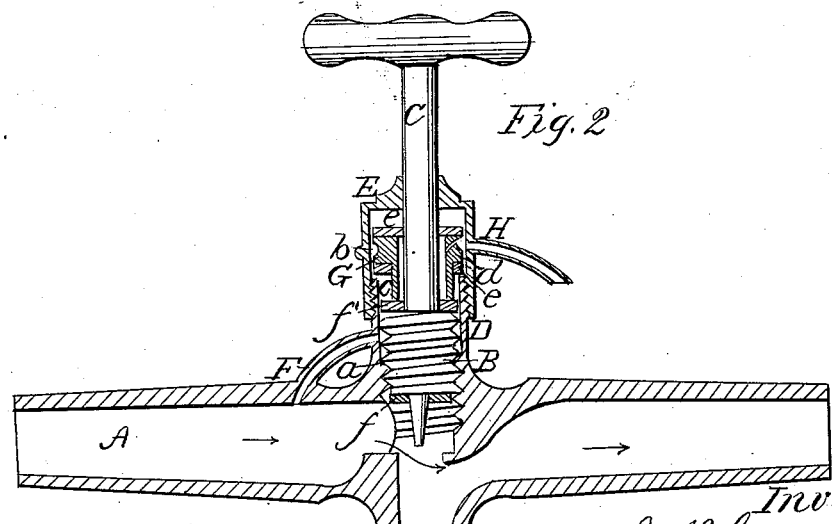

Figures 1 and 2 are longitudinal central sections of my invention.

This invention relates to a new and useful means for allowing of the escape of waste water from cocks, faucets, &c., to prevent the freezing up of the same during winter.

A represents the body or main portion of a cock or faucet, and B is a rising and falling valve placed in A and operated by a screw, $a$, the stem C of the valve passing up through a chamber or barrel, D, and through a cap, E, on the top of D, as shown in both figures.

F represents a tube, which forms a communication between the body A of the cock at the rear of valve B and the chamber or barrel D.

G is a circular disk fitted within the cap E and having a grooved periphery, $b$, and also a pendent concentric tube, $c$, through which the valve-stem C passes, the stem also passing through the disk G. This groove $b$ forms a water-passage all around G and obviates any difficulty which might otherwise occur from the turning of the disk in the cap. The tube $c$ is larger in diameter internally than the stem C, so as to afford a water-passage up between C and the interior of $c$, and the interior of the tube $c$ communicates with the groove $b$ in the periphery of the disk G by means of a hole or opening, $d$. (Shown in both figures.)

H is a tube, which is in line with the groove $b$ of the disk G, and this disk is provided with packing $e$, in order that it may fit air and water tight within the cap E.

The valve B is virtually two valves, as both its upper and lower surfaces act as such, the latter surface, $f$, when the valve is down closing the body or main portion A of the cock or faucet, as shown in Fig. 1, and the upper surface, $f'$, when the valve is raised closing the lower end the tube $c$, as shown in Fig. 2.

From the above description it will be seen that when the valve B is closed so as to stop the flow of water through A, the waste water at the rear of the valve will pass up through the tube F and enter the chamber or barrel D above the valve, and thence pass up into tube $c$ through the hole or opening $d$ into groove $b$, and thence out through tube H, as shown by the red arrows in Fig. 1; and it will further be seen that when the valve B is raised or opened the upper surface of the valve will close the lower end of tube $c$ and stop the escape of water through H while the discharge is allowed through A, as will be fully understood by referring to Fig. 2.

Thus by this simple means a free escape is allowed the waste water each time the cock is closed or the flow through it stopped and all difficulty from freezing avoided.

I claim as new and desire to secure by Letters Patent—

1. The tube F, arranged relatively with the body A of the cock or faucet, and the chamber or barrel D and the valve B, in connection with the tube $c$, disk G, and escape-spout H, substantially as and for the purpose specified.

2. The groove $b$ in the periphery of disk G, when used in connection with the parts specified in the first claim, for the purpose of affording an annular chamber around the disk G, as described.

JOSEPH P. GALLAGHER.

Witnesses:
J. B. HIGDON,
WILSON HENLEY.